C. W. SHARTLE.
APPARATUS FOR MAKING PULP USED IN THE MANUFACTURE OF PAPER.
APPLICATION FILED JUNE 17, 1920.
1,415,902.
Patented May 16, 1922.
5 SHEETS—SHEET 1.
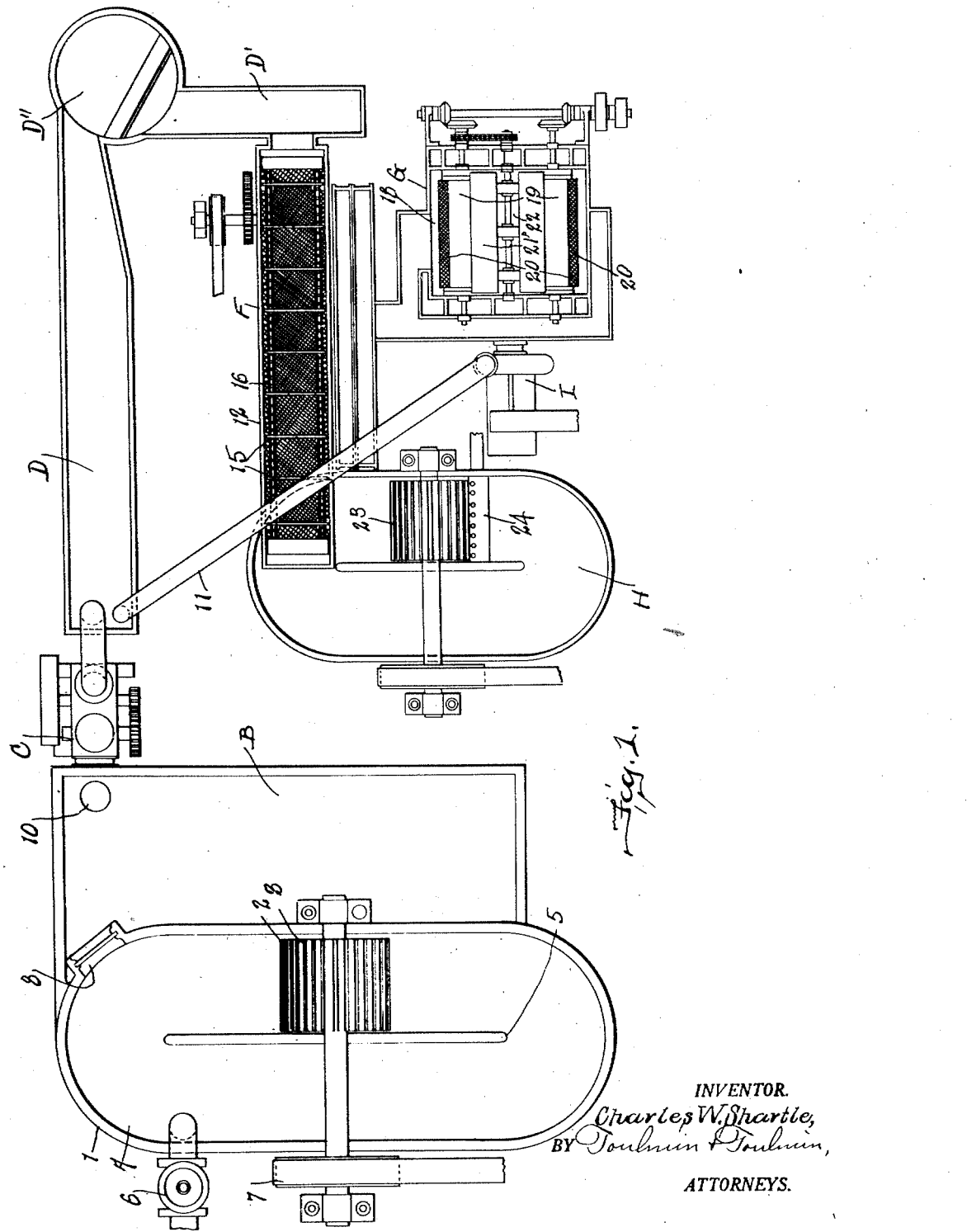
INVENTOR.
Charles W. Shartle,
BY Toulmin & Toulmin,
ATTORNEYS.

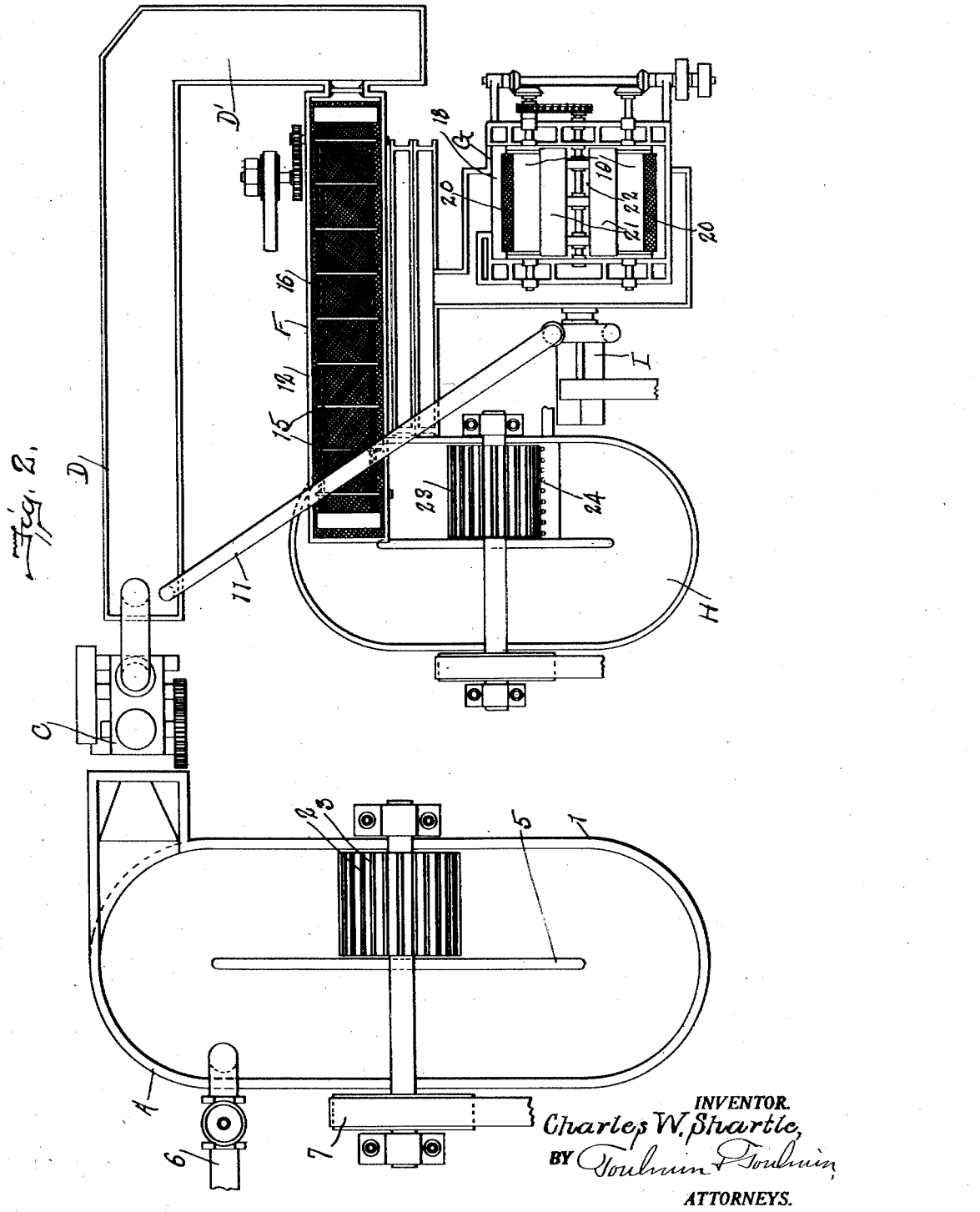

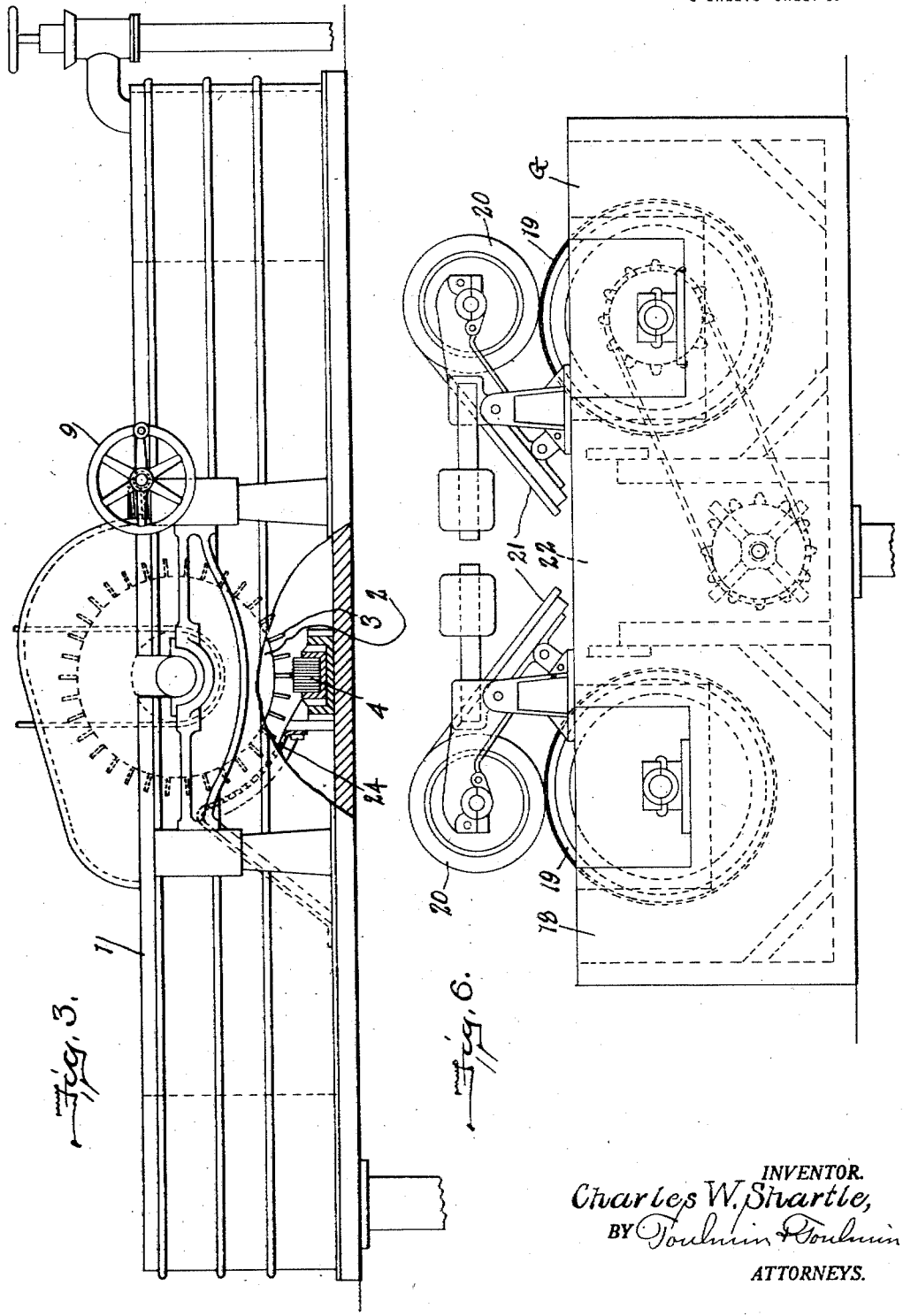

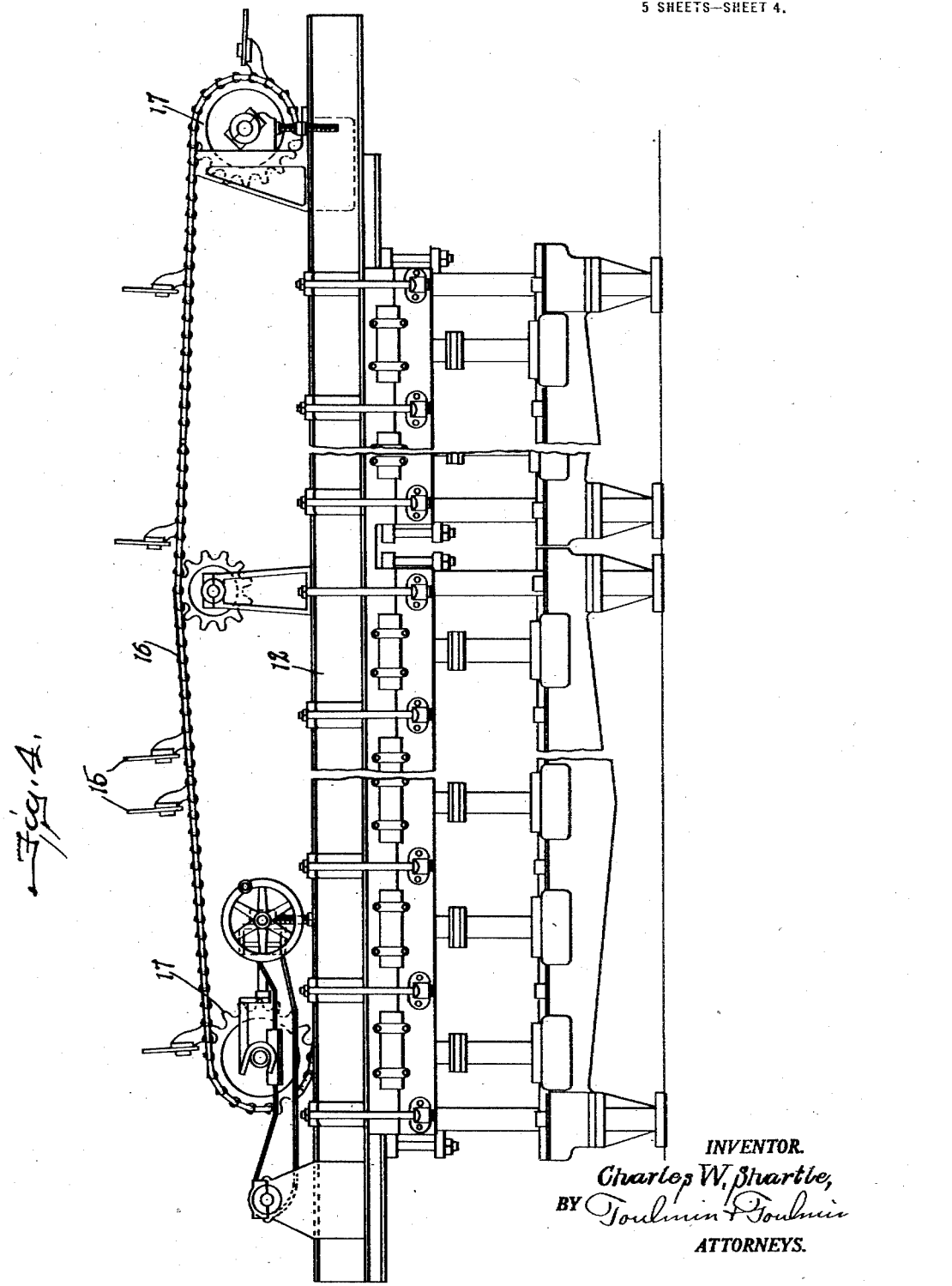

C. W. SHARTLE.
APPARATUS FOR MAKING PULP USED IN THE MANUFACTURE OF PAPER.
APPLICATION FILED JUNE 17, 1920.
1,415,902.
Patented May 16, 1922.
5 SHEETS—SHEET 5.
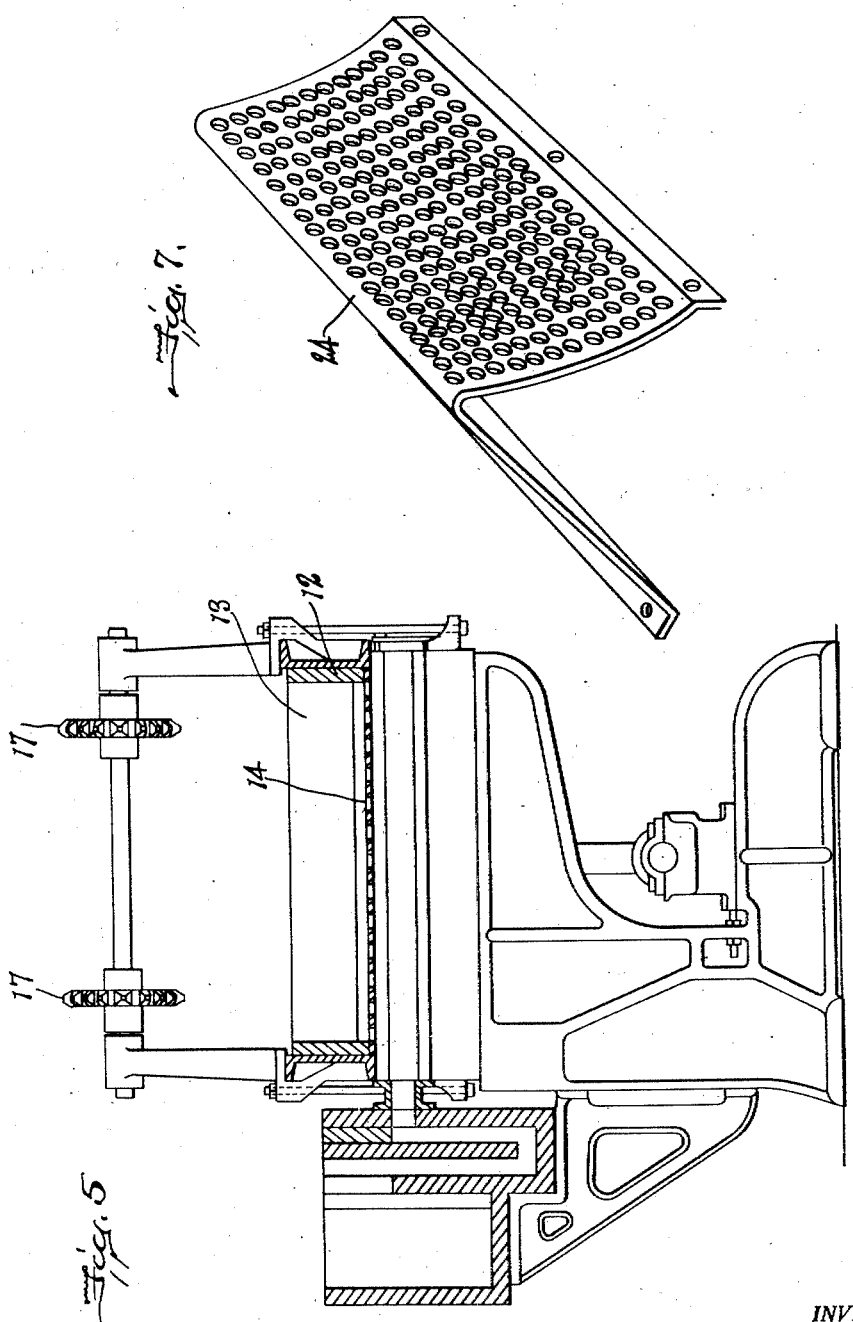
INVENTOR.
Charles W. Shartle,
BY
ATTORNEYS.

UNITED STATES PATENT OFFICE.

CHARLES W. SHARTLE, OF MIDDLETOWN, OHIO.

APPARATUS FOR MAKING PULP USED IN THE MANUFACTURE OF PAPER.

1,415,902.  Specification of Letters Patent.  Patented May 16, 1922.

Application filed June 17, 1920. Serial No. 389,582.

*To all whom it may concern:*

Be it known that I, CHARLES W. SHARTLE, a citizen of the United States, residing at Middletown, in the county of Butler and State of Ohio, have invented certain new and useful Improvements in Apparatus for Making Pulp Used in the Manufacture of Paper, of which the following is a specification, reference being had therein to the accompanying drawing.

This invention relates to improved apparatus for making pulp used in the manufacture of paper, and has for its particular object to arrange the various units of the apparatus in such relation one with another that the reduction of the material from raw stock to finished pulp may be a continuous process, or interrupted only in the initial step of reduction.

Two forms of construction are shown herein, one form being in effect a continuous beater or continuous reduction apparatus, the other form being different from the first only with respect to the manner of handling the raw stock through the breaker.

The invention relates to a well-known problem which involves various difficulties in the manufacturing of pulp, the object of the invention being to overcome or at least greatly minimize these difficulties to the end that both cheaper and better pulp, and more especially cheaper and better grades of paper may be made from the average grades of raw stock.

The difficulties arise in most part from the miscellaneous and variable character of the raw stock. This material consists usually of sulphite, ground wood pulp, paper scrap and rags in variable proportions, and consisting of a mixture of all grades of paper and card board and from the coarsest to the finest of fibrous materials, such as cordage, burlaps, canvas, cottons, linens, silks, etc.

With this miscellaneous and variably proportioned raw stock there is also usually a liberal mixture of foreign materials, such as wood, metal, glass, brick, and other irreducible substances which, if not removed from the pulp mass early in the reduction operations will cause injury to the reduction machinery and otherwise interfere with the normal operation of the apparatus.

These problems relate in a decisive way to the cost of production and also to the quality of the product, as normal operation of the apparatus is essential to both quantity and quality production of pulp, and the best quality of paper products of any given kind or grade can be produced only from pulp reduced to even consistency and uniform fineness.

The present invention, therefore, is directed to providing an apparatus in which the various units of the pulp reducing machinery are of such a character and so co-ordinated one with another that there will be continuity of operation in the apparatus as a whole, the whole mass of pulp material being constantly in motion, passing from one step of reduction to another in an endless round of operations until the entire mass is reduced to pulp of the required grade; due provision being made to eliminate foreign materials from the mass early in the operation by gravity action.

In the practice of this continuous system of reduction it has been found that with certain grades of raw stock, or where certain grades of pulp are to be made, that the nonfibrous material, such as paper and ground wood pulp which is lighter and more readily reduced than the fibrous material, such as the different kinds and grades of rags and other fabrics, will rise to the surface of the pulp mass and, therefore, will flow from the breaker or grinder in disproportionate amounts, thus affecting the quality of the grade of pulp being made. The tendency of the fibrous or heavier materials is to sink in the pulp mass, with the result that there will be an excessive accumulation of the fibrous material in the breaker, thus developing an abnormal condition which will render uniformity of reduction and the maintenance of grade impossible.

To correct this condition the second form of construction herein shown is provided. In this apparatus the raw stock is ground in the breaker and delivered therefrom in batches into a tank or reservoir where it is then taken up by the other units of the apparatus in continuous operation, as under the other form of construction.

Under this construction all the raw stock of a given batch is retained in the breaker until the whole is reduced to a given state when a considerable portion of the mass will be discharged from the breaker into a reservoir at one time. Thus the normal proportion of the materials in the raw stock will be maintained as the mass then enters into the successive phases of continuous reduction which follow.

After each batch of material is discharged therefrom, the breaker is again recharged with raw stock and the operations of grinding and discharging the material are repeated as before.

In the drawings:

Fig. 1 is a general plan view of one form of the improved apparatus comprised in the invention as a whole;

Fig. 2 is a plan view of the second form of construction;

Fig. 3 is a side elevation of the raw stock breaker or grinder;

Figs. 4 and 5 are a broken side elevation and vertical sectional view, respectively, of the grading screen;

Fig. 6 is a side elevation of the extractor or thickener, showing in dotted lines the arrangement of the interior mechanism thereof; and Fig. 7 is a detail view showing a detail feature of the finishing beater.

It will be understood that the different mechanical units of the apparatus here shown are for illustrative purposes only. Various modifications as to form or details of construction and arrangement may be made without departing from the underlying principle and the spirit of the invention.

Referring to Fig. 1 of the drawings the apparatus here shown as a whole comprises the breaker A, reservoir B, pump C, settling troughs D—D' and whirlpool D'', screen F, thickener G, beater H and pump I, the different units being coordinated one with another in a suitable manner to effect the reducing operations for the making of pulp.

The construction shown in Fig. 2 of the drawings is substantially the same as that shown in Fig. 1, except that the reservoir B is not employed in this construction. The material in this apparatus constantly overflows the breaker A to the pump C and passes from thence through the successive steps of reduction, as under the construction shown in Fig. 1.

The breaker A, as here shown, consists of the usual tank 1. Supported in suitable bearings in the opposite side walls of the tank is the breaker roll 2 which has arranged on its periphery in the usual manner a series of breaker blades 3, cooperating with a bed block 4 in the bottom of the tub 1 to break up the raw stock with which the breaker may be charged in any suitable manner.

The length of the breaker roll 2 is substantially equal to half the width of the tank 1. The material in the tank will be kept in continuous circulation by the action thereon of the blades 3. A partition 5 extends longitudinally along the center of the tank and serves to cause the material to move through the tank in a fixed circuitous course. Water in any required quantity may be supplied to the tank from a pipe 6, and the breaker roll may be operated from any suitable source of power by means of the belt connection 7. By means of a discharge valve 8 any desired amount of the material may be drawn from the tank 1 and delivered into the reservoir B in one batch. While the material is being withdrawn operation of the breaker may be stopped or continued as may be determined by the operator without hindrance with the other units of the apparatus.

The action on the raw stock in the breaker A consists merely of rough grinding or breaking up of the stock. The breaker blades 3 are usually heavy and dull and are not easily injured by the foreign substances in the raw stock. The breaker roll 2 may be adjusted vertically relative to the bed block 4 by means of an adjusting mechanism 9, as may be required by the condition of the stock. The material in the breaker is usually a dense mass, and the irreducible foreign material in most part remains suspended therein and is delivered in the discharge of the material into the reservoir B, and thence through the pump C into the settling trough D.

The reservoir B may be of any suitable size and construction, and may be provided with any suitable means to deliver the material to the pump C. As here shown the material flows continually through a discharge port 10 in the bottom of the tank and the pump C being in constant operation, there is continuous delivery of the material to the settling trough D.

In the settling trough sufficient water is added to the pulp mass from the pump I through pipe 11 to thin the material which flows slowly through the trough to the whirlpool D''. The heavy foreign substances, becoming separated from the mass by gravitation as the material moves along, accumulate in the bottom of the trough and may be removed therefrom at any time without interrupting the normal operation of the apparatus or may be permitted to accumulate in the trough and removed at intervals when operation is discontinued.

In the whirlpool D'' the material has a torsional or whirling movement which may be produced entirely by gravity action, or with the assistance of mechanical agitators. This effects intermixture of the pulp mass and causes light foreign or irreducible materials to rise to the surface of the mass where the same may be skimmed off and removed from the apparatus. The whirlpool is in effect a part of the settling troughs D and D', being a means only to facilitate the separation of the foreign materials from the pulp as it passes through the trough.

From the whirlpool the material flows by gravity through the trough D' onto the screen F where the first grading of the pulp is effected. As here shown the screen consists of a frame structure 12, see Figs. 4 and 5, a channel or cradle 13 extending longitudinally of the frame, screens 14 arranged transversely in the bottom of the channel 13 and scrapers 15 which are attached to endless chains 16 traversing sprockets 17 arranged centrally and at opposite ends of the machine. The scrapers being moved by the travel of the chain through the channel 13, move the pulp material over the screens 14 which may be of any suitable mesh to effect the desired grading of the pulp.

Such portions of the material reduced to required fineness, together with the greater portion of the water contained in the material, will pass through the screens into the extractor or thickener G. The coarser material, not fine enough to pass through the screens will be discharged by the forward travel of the scrapers 15 into the finishing beater H.

The thickener G, as here shown, consists of a tank 18 and the double sets of cylinder molds 19, couch rolls 20 and scrapers 21, a hopper 22 being arranged to receive the discharge of material from the scrapers. As the material is carried upward from the tank between the cylinder molds and couch rolls, the greater portion of the water is pressed out of the pulp, the water being drawn from the tank 18 and returned to the settling trough D by the pump I. The finished pulp delivered into the hopper 22 may be discharged therefrom by any suitable means, not shown, to a stuff chest or other receptacle for the finished material, or may be delivered direct to a paper forming machine.

The material discharged from the screen F into the beater H consists of a high percentage of the better grade, or fibrous stock, from which the finer grades of paper are made, the material passing through the screen into the thickener G, consisting in most part of the lower grade, or non-fibrous material from which the cheaper grades of paper are made. Thus a grading of stock is effected which gives to the manufacturer a material advantage in the higher prices he is able to realize on the fibrous stock as distinguished from common practice where but one grade of stock is produced.

The beater H, as here shown, is preferably equipped with perforated backfall plate 24, as best shown in Fig. 7. This is an improved feature of beater construction which forms the subject matter of U. S. Patent No. 1,271,426, issued to Brownell Buehler July 2, 1918, and which forms an important detail of the apparatus in the several forms herein shown.

The beater H is similar in construction and operation to the breaker A, except as to the character of the beater knives 23 and cooperation therewith of the backfall 24. The perforations in the backfall plate may be of any suitable size to determine the grade of the finished pulp. The beater is continuously operated and the material passes through the backfall plate as fast as it is reduced to the required state of fineness. From the beater H the material may be delivered, as from the thickener 6, to any suitable receptacle for the finished pulp.

From the foregoing detailed description and the illustrations of the drawings the general construction and arrangement of the different units of the reducing apparatus, the different steps of the operation and the results accomplished thereby will be readily understood by those experienced in this art.

As far as I am aware the basic features of the apparatus which provide for the continuous and coordinated reducing operations as exemplified in the one form of construction, and which provide for treatment of the material in batches in the first steps of reduction in the other form of construction, are broadly new in this art. I desire to claim the invention broadly, therefore, without reference to the details of construction and operation as defined in the appended claims.

Having thus fully described my invention, what I claim as new and desire to secure by Letters Patent, is:—

1. In a pulp reducing apparatus, the combination, with a breaker adapted to be charged with raw stock and to grind the stock to initial reduction, of a settling trough, means to deliver the reduced material from the breaker to said trough, screening mechanism into which the floating material is delivered from the settling trough, thickening mechanism connected to receive the screenings from the screening mechanism and adapted to separate water from these fine screenings and to deliver them as one finished product, and a beater arranged to receive the tailings from said screening mechanism and adapted to continuously reduce said tailings and having a discharge opening for the fine material produced thereby, whereby another finished product is delivered.

2. In a pulp reducing apparatus, the combination, with a breaker adapted to be charged with raw stock and to grind the stock to initial reduction, of a tank adapted to receive the ground stock from the breaker in batches, a settling trough adapted to receive the stock from said tank, screening mechanism adapted to receive the floating material from said trough, a thickening mechanism arranged to receive the screenings from the screening mechanism to separate water therefrom and to deliver such screenings as one finished product, and a beater arranged to receive the tailings from said screening mechanism to continuously beat these tailings and having a backfall by which the fine particles are discharged from the beater to form another product.

3. In a pulp reducing apparatus, the combination, a breaker adapted to be charged with raw stock and to grind the stock to initial reduction, a tank adapted to receive the material from the breaker in batches, and means cooperating with the tank to receive the material therefrom and acting by continuous operation to reduce the material to finished pulp.

4. In a pulp reducing apparatus, the combination, a breaker adapted to be charged with raw stock and to grind the stock to initial reduction, and means cooperating with the breaker to receive the material therefrom in successive batches and acting by continuous operation to reduce the material to finished pulp.

5. In a pulp reducing apparatus, the combination, a breaker adapted to be charged with raw stock and to grind the stock to initial reduction, and means cooperating with the breaker to receive the material therefrom in batches and acting by continuous operation to separate foreign substances from the mass of material and to reduce said material to finished pulp.

6. In a pulp reducing apparatus, the combination, a breaker adapted to be charged with raw stock and to grind the stock to initial reduction, and means cooperating with the breaker to receive the material therefrom in batches and acting by continuous operation to reduce said material to finished pulp of different grades.

In testimony whereof, I affix my signature.

CHARLES W. SHARTLE.